United States Patent Office.

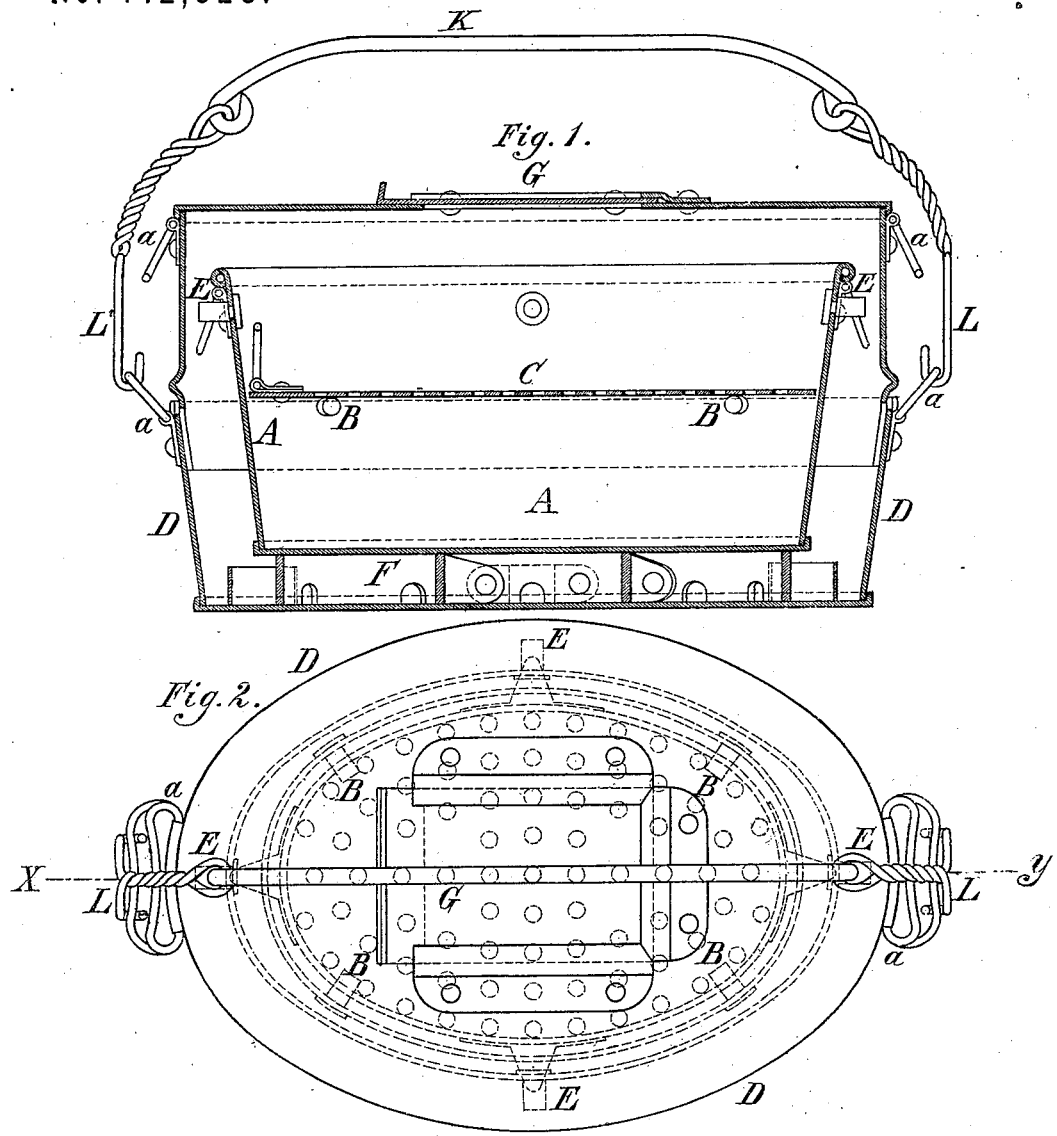

JOHN G. METSKER, OF LOGANSPORT, INDIANA.

IMPROVEMENT IN BAKE-PANS.

Specification forming part of Letters Patent No. 142,928, dated September 16, 1873; application filed April 18, 1873.

*To all whom it may concern:*

Be it known that I, JOHN G. METSKER, of Logansport, county of Cass and State of Indiana, have invented a new and useful Apparatus for Baking, Roasting, Steaming, and Toasting; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1 is a central vertical longitudinal section of the device embodying my invention. Fig. 2 is a top or plan view thereof.

Similar letters of reference indicate corresponding parts in the several figures.

This invention consists in a pan formed with projections on its inner side for supporting a plate or diaphragm, in combination with a double inclosing-case provided with a sliding door, all as hereinafter fully described and set forth.

Referring to the drawings, A represents a pan, which is of circular, oval, or other form, and constructed of sheet metal or other material. From the inner face of this pan there project horizontally at certain intervals or spaces pins, studs, lugs, or otherwise, B B, which form ledges, and constitute rests for a perforated plate, C, which is laid on said stud, and divides the pan A into two parts, thus producing a double chamber for the reception at the same time of various or different articles to be roasted and steamed, &c. D represents a case which incloses the pan A, and consists of two parts or sections which are fitted to each other, and each preferably provided with handles *a*, for purposes of convenience. From the outside of the pan A there project horizontally pins or studs E, which are arranged at such localities that when the pan is placed within the case D the former is held from contact with the latter, owing to the interposed studs E. When the pan A is applied to the case D, it is rested on a spider, F, which is placed on the bottom of the lower section of the case D, and when the upper section is fitted on said lower section, the pan is completely isolated from the case D, there being intervening spaces on all sides between said pan and case.

The food having been properly previously introduced into the pan A, the latter is introduced into the case D, and thus placed in the oven. The food will be subjected to the powerful action of heat retained within the case D, and without loss or escape of aroma or matter arising from the food.

In the top of the upper section of the case D I form an opening, which is to be covered by a door or slide, G, which acts as a damper to permit, when desired, the escape of vapor from the food, and thus facilitate the operation of baking, &c. At the same time said door allows inspection of the interior of the case for viewing and determining the condition of the food in the pan A.

In order to conveniently apply and remove the case or pan to and from the oven, I employ a holder, which consists of the handle K and hooks L jointed to the ends thereof, the latter being adapted to engage with the loops or rings at the sides or ends of the case or pan.

The operation will be readily understood by referring to Fig. 1.

Having thus described my invention, what I claim as new, and desire to secure by Letters Patent, is—

The pan A, formed with the projections B, and provided with the plate C, in combination with the double inclosing-case D provided with the door G, as herein shown and described.

The above signed by me this 25th day of March, 1873.

JOHN G. METSKER.

Witnesses:
W. CARR,
D. H. MALL.